United States Patent
Buvat et al.

(10) Patent No.: US 8,033,804 B2
(45) Date of Patent: Oct. 11, 2011

(54) PRESSURE MEASUREMENT DEVICE AND MOULD FOR VULCANIZING RUBBER FOR TIRES

(75) Inventors: Gérard Buvat, Marsat (FR); Henri Hinc, Romagnat (FR); Frederic Pialot, Moissat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 296 days.

(21) Appl. No.: 12/491,204

(22) Filed: Jun. 24, 2009

(65) Prior Publication Data

US 2009/0324763 A1 Dec. 31, 2009

(30) Foreign Application Priority Data

Jun. 26, 2008 (FR) ...................... 08 54272

(51) Int. Cl.
*B29C 35/02* (2006.01)
*G01L 19/00* (2006.01)
(52) U.S. Cl. ............. 425/28.1; 73/714; 73/715; 73/726; 73/727; 73/756; 425/29; 425/170
(58) Field of Classification Search ................. 425/28.1, 425/29, 149, 170; 73/714, 715, 720, 721, 73/726, 727, 756
See application file for complete search history.

(56) References Cited

U.S. PATENT DOCUMENTS

| 2,399,342 | A |   | 9/1944  | Gibbons et al. |
| 3,929,012 | A |   | 12/1975 | Anagnostopoulos et al. |
| 4,143,114 | A |   | 3/1979  | Smith et al. |
| 4,502,857 | A |   | 3/1985  | Hinks |
| 4,898,035 | A | * | 2/1990  | Yajima et al. ................... 73/727 |
| 6,345,974 | B1|   | 2/2002  | Kawasaki et al. |

FOREIGN PATENT DOCUMENTS

| CH | 679 469   |   | 2/1992 |
| CH | 679951    | * | 5/1992 |
| DE | 11 31 394 |   | 6/1962 |
| DE | 39 20424  |   | 4/1991 |

* cited by examiner

*Primary Examiner* — James Mackey
(74) *Attorney, Agent, or Firm* — Cozen O'Connor

(57) ABSTRACT

A device (20) comprising a pressure measurement surface (28) functionally attached to a proof body (22) and a rigid component (30), functionally attached to the proof body (22), the measurement surface (28) forming a surface of the rigid component (30). In addition, the device comprises a support (38), functionally separated from the proof body (22), of generally annular shape, housing the rigid component (30) and a flexible mass (40) radially inserted between the support (38) and the rigid component (30) such that the contour of the measurement surface (28) is bounded by the flexible mass (40), this flexible mass (40) adhering to the support (38) and to the rigid component (30).

11 Claims, 1 Drawing Sheet

PRESSURE MEASUREMENT DEVICE AND MOULD FOR VULCANIZING RUBBER FOR TIRES

RELATED APPLICATION

This application claims the priority of French patent application no. 08/54272 filed Jun. 26, 2008, the entire content of which is hereby incorporated by reference.

FIELD OF THE INVENTION

This invention relates to the technical field of tires and, more particularly, the manufacture of these tires.

BACKGROUND OF THE INVENTION

It is known that tires can be manufactured by heating a rubber-based raw blank of the tire in a mould of generally annular shape around an axis of revolution. The heating of the raw blank leads to its vulcanization.

More particularly, during vulcanization, the pressure exerted by the mass of rubber on an inner wall of the mould must be checked, especially to determine the transition from raw state to cured state of the mass of rubber.

It is known that this pressure can be checked using a pressure sensor comprising for example a box equipped with a lateral wall and an end side forming a pressure measurement surface on which the pressure to be measured is exerted. The box is also intended to house a proof body functionally attached to the measurement surface.

Traditionally, the measurement surface deforms itself under the effect of a pressure force and transmits this mechanical deformation to the proof body which converts this deformation into a physical quantity intended for a detector sensitive to this quantity.

In order to measure the pressure exerted by the rubber on the inner wall of the mould, the pressure sensor is inserted in a housing provided for this purpose inside the mould such that its measurement surface is in contact with the rubber.

When the blank is raw, however, a rubber residue may flow inside the sensor housing, especially along the outer wall of its box. During vulcanization, this rubber residue may expand and exert a pressure on the wall of the box deforming the wall as well as the sensor measurement surface.

This unwanted deformation of the measurement surface generates incorrect pressure measurements.

OBJECTS AND SUMMARY OF THE INVENTION

One object of the invention is to provide a pressure measurement device which overcomes disadvantages of the prior art while being simple to manufacture.

One aspect of the invention is directed to a pressure measurement device comprising:
a pressure measurement surface functionally attached to a proof body
a rigid component, functionally attached to the proof body, the measurement surface forming one surface of the rigid component,
a support, functionally separated from the proof body, of generally annular shape, housing the rigid component, and
a flexible mass inserted radially between the support and the rigid component such that the contour of the measurement surface is bounded by the flexible mass, this flexible mass adhering to the support and to the rigid component.

Due to the presence of the flexible mass bounding the contour of the measurement surface and adhering both to the support and to the rigid component, the rubber cannot flow inside the pressure measurement device housing and therefore disturb the pressure measurement.

In addition, since the support is functionally separated from the proof body, a rubber residue can flow in the gaps formed between an outer wall of the support and an inner wall of the housing, with no risk of disturbing the measurement of the pressure exerted on the measurement surface.

A pressure measurement device according to an embodiment of the invention may comprise one or more of the characteristics according to which:
at least one of the elements amongst the support and the rigid component comprises an annular adherence surface of type groove and collar,
the rigid component comprising first and second opposite end sides, the first side forming the measurement surface and the second side forming a side in contact with a deformable surface functionally attached to the proof body,
the area of the end side of the component is equal to the area of the deformable surface,
the flexible mass is overmoulded on the rigid component and on the support,
the rigid component is made from a non-deformable material, for example consisting mainly of polyetheretherketone (PEEK),
the flexible mass is made from a material consisting mainly of silicone or a butyl-based rubber,
the proof body is of piezoelectric or strain gauge type,
the support comprises an outer surface designed to fit into a hole of a mould opening into the cavity which will contain a material whose pressure is to be measured.

Another aspect of the invention relates to a unit comprising a pressure measurement device as defined above and a mould for vulcanizing rubber for tires comprising:
an inner wall forming a cavity for the rubber, and
a hole opening out into the cavity and being intended to house the device.

BRIEF DESCRIPTION OF THE DRAWINGS

The invention will be better understood from the following description, given solely by way of example and by referring to the drawings wherein.

DETAILED DESCRIPTION OF THE DRAWINGS

Figure 1:
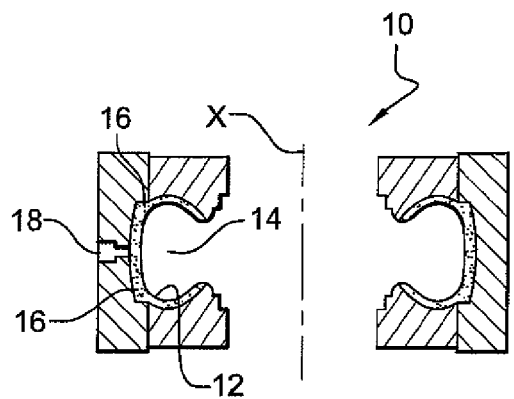
FIG. 1 represents a cross-section of a mould for vulcanizing a mass of tire rubber comprising a pressure measurement device according to an embodiment of the invention.

FIG. 1 shows a mould for vulcanizing a raw automotive vehicle tire blank, designated by the general reference 10. As shown on the cross-section of FIG. 1, the mould 10 has a generally annular shape around an axis of revolution X. This mould 10 comprises an inner wall 12 forming an open inner cavity 14 for containing material, in this case a rubber 16 forming the raw tire blank.

Figure 2:
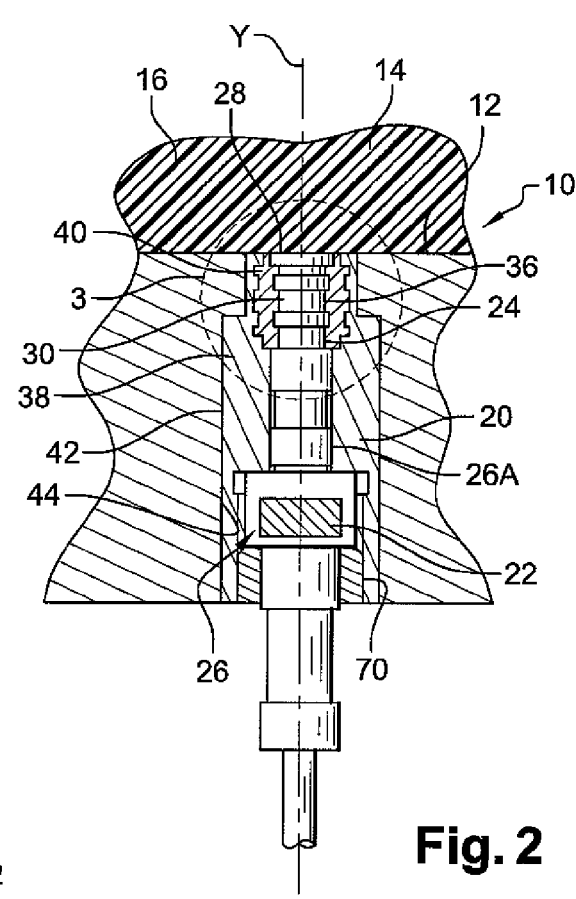
FIG. 2 represents an elevation view of the device shown on FIG. 1.
Figure 3:
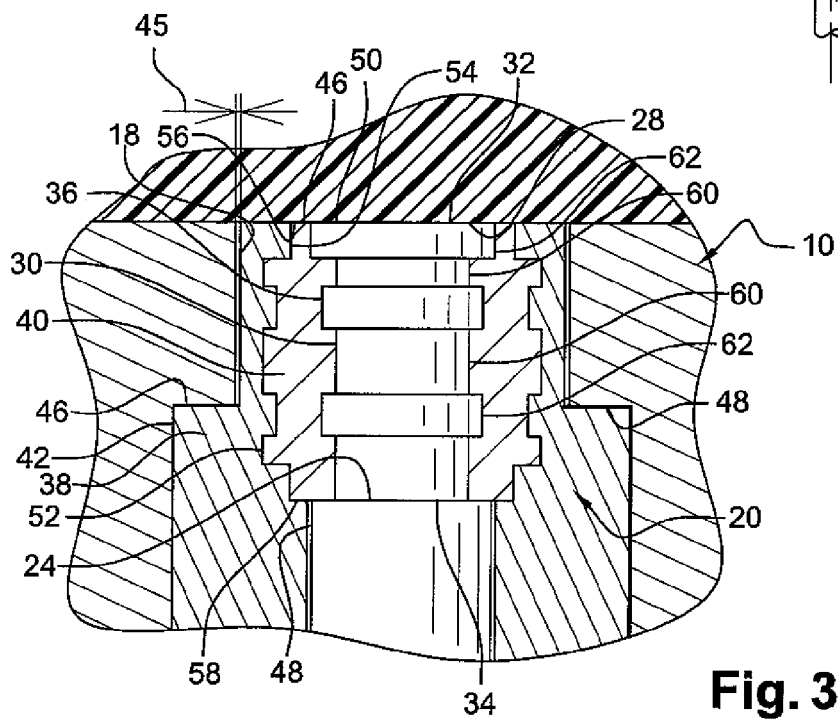
FIG. 3 represents a detail view of the part circled on FIG. 2.

This mould 10 comprises a hole 18 opening out inside the cavity 14 for containing rubber 16 during its vulcanization. This hole 18 is designed to house a device 20 for measuring a pressure exerted, in particular by the rubber 16 during its vulcanization, on the inner wall 12 of the mould 10 (FIGS. 2 and 3). The mould 10 and the device 20 form a unit.

The device 20 comprises a proof body 22. Traditionally, the proof body 22 subjected to the pressure to be measured converts it into another physical quantity such as a deformation, displacement, etc. In addition, the device 20 comprises a detector (not shown) which is sensitive to this physical quantity and which is designed to convert this detected quantity into, for example, an electronic signal for transmission to means for displaying the measured pressure (not shown).

The device 20 also comprises a deformable surface 24 functionally attached to the proof body 22. Preferably, the proof body 22 comprises a piezoelectric type element capable of converting the mechanical deformation of the deformable surface 24 into an electric signal intended for the detector. As a variant, the proof body comprises a strain gauge type element.

The device 20 also comprises a box 26 for housing the proof body 22 and the detector, the box 26 comprising at least one end side formed by the deformable surface 24 and a lateral wall 26A of generally cylindrical shape. The surface 24 is functionally attached to the proof body 22, such that when a pressure is exerted on the surface 24, the resulting deformation of this surface 24 is transmitted to the proof body 22.

In addition, the device 20 comprises a pressure measurement surface 28 on which the pressure to be measured is exerted. This measurement surface 28 is functionally attached to the proof body 22. The device 20 therefore comprises a rigid component 30 designed to transmit the pressure exerted on the measurement surface 28 to the deformable surface 24.

This rigid component 30 comprises first 32 and second 34 opposite end sides, the first side 32 forming the measurement surface 28 and the second side 34 forming a side in contact with the deformable surface 24 of the device 20. In this example, the rigid component 30 has a body of generally cylindrical shape comprising a lateral wall 36 connecting together its two opposite end sides 32 and 34.

Preferably, the rigid component 30 is made from a material consisting mainly of polyetheretherketone (PEEK) to avoid any adhesion between the measurement surface 28 and the material forming the rubber 16 during vulcanization.

In addition, in this example, the area of the first end side 32 of the component 30 is equal to the area of the deformable surface 24. Possibly, as a variant, the area of the first end side 32 of the component 30 may be different from the area of the deformable surface 24 and, in this case, the device 20 comprises means (not shown) for applying a correction coefficient to the pressure measured, which depends mainly on the ratio of the two areas.

The device 20 also comprises a support 38 functionally separated from the proof body 22 of generally annular shape around an axis of revolution Y and housing the rigid component 30.

In the example illustrated on FIG. 2, therefore, the support 38 comprises an outer surface 42 of shape complementary to an inner wall 44 of the hole 18 and this outer surface 42 is intended to fit in the hole 18. As illustrated in detail on FIG. 3, there is a gap 45 between the outer surface 42 of the support 38 and the inner wall 44 of the hole 18 to make it easier to fit the device 20 into the hole 18.

In addition, in the example described, the outer surface 42 has an annular peripheral positioning shoulder 46 intended to come up against an annular stop 48 of complementary shape formed in the inner wall 44 of the hole 18. In addition, the support 38 is made for example from a metallic material.

The device 20 further comprises a flexible mass 40 inserted radially between the support 38 and the rigid component 30.

More particularly, the flexible mass 40 is housed in the support 38 such that the contour of the first end side 32 of the component 30 and therefore the contour of the measurement surface 28 is bounded by the flexible mass 40.

Furthermore, the flexible mass 40 adheres to the support 38 and to the rigid component 30. The flexible mass 40 therefore has a generally annular shape surrounding the lateral wall 36 of the rigid component 30 and is bounded by an inner adherence surface 50 adhering to the wall 36 of the rigid component 30 and an outer adherence surface 52 adhering to an inner wall 54 of the support 38. The outer 52 and inner 50 surfaces of the flexible mass 40 are connected together by first 56 and second 58 opposite end sides. The first end side 56 bounds the contour of the measurement surface 28 and the second end side 58 bounds the contour of the side of the component 30 in contact with the deformable surface 24.

Each adherence surface 50 and 52 respectively of the rigid component 30 and the support 38 adhering to the flexible mass 40 is of type groove 60 and collar 62.

In this example, the box 26 housing the proof body 22 is attached to the support 38 by a nut 70 in order to calibrate the device 20. Preferably, in order to obtain adherence, the flexible mass 40 is overmoulded, for example by injection, on the rigid component 30 and on the support 38. The rigid component 30 may advantageously be made from turned steel. For example, the flexible mass 40 is made from a material consisting mainly of silicone or a butyl-based rubber.

As can be seen on FIGS. 2 and 3, when mounted inside the hole 18, the measurement surface 28 of the device 20 is flush with the inner wall 12 of the mould 10. With this arrangement, the device 20 can be inserted in the mould 10 while avoiding the formation of reliefs on the inner wall 12 of the mould 10 which could mark the blank.

We will now described the main operating aspects of the pressure measurement device.

Initially, the rubber 16 forming the raw blank, housed in the inner cavity 14 of the mould 10 is in a state allowing it to flow on the inner wall 12 and on the measurement surface 28 flush with this inner wall 12.

Since the contour of the measurement surface 28 is bounded by the flexible mass 40 which adheres firstly to the support 38 and secondly to the rigid component 40, the flexible mass 40 prevents the rubber 16 from flowing in particular along the outer wall 26A of the box 26 which is functionally attached to the proof body 22 of the device 20.

During its vulcanization, the rubber 16 expands with temperature and the pressure exerted by the rubber 16 on the inner wall 12 of the mould 10 increases.

Since the measurement surface 28 of the device 20 is flush with the inner wall 12 of the mould 10, as it expands the rubber 16 exerts a pressure of identical value on this surface 28 and on the wall 12.

The pressure exerted on the measurement surface 28 by this rubber 16 is transmitted via the rigid component 30 to the deformable surface 24 functionally attached to the proof body 22. Since the mass 40 is flexible, in fact, the rigid component 30 can move in the mass 40 and deform the deformable surface 24 by its second end side 34 pressing against this surface 24. The deformable surface 24 functionally attached to the proof body 22 transmits information regarding its mechanical deformation to the proof body 22 which will convert this deformation into another electrical quantity, for example an electrical quantity to which the detector is sensitive. Traditionally, the detector converts the physical quantity detected into electronic signals.

A residue of rubber 16 may possibly flow in the gap 45 formed between the support 38 and the inner wall of the hole 18. In this case, however, due to the fact that the support 38 is functionally separated from the proof body 22, the rubber residue exerts a pressure on the support 38 without the pressure being transmitted to the elements of the device 20 which are functionally attached to the proof body 22.

Lastly, since the deformable surface 24 may be relatively fragile, it is protected from mechanical shocks and attacks likely to occur on the inner wall 12 of the mould 10 for example when removing the cured tire blank, since the surface 24 is separated from the inner cavity 14 of the mould by the rigid component 38 and the flexible mass 40.

The invention claimed is:

1. A pressure measurement device comprising:
    a pressure measurement surface functionally attached to a proof body;
    a rigid component, functionally attached to the proof body, the measurement surface forming one surface of the rigid component;
    a support, functionally separated from the proof body of generally annular shape, housing the rigid component; and
    a flexible mass inserted radially between the support and the rigid component such that the contour of the measurement surface is bounded by the flexible mass, this flexible mass adhering to the support and to the rigid component.

2. The device according to claim 1, wherein at least one of the support and the rigid component comprises an annular adherence surface of type groove and collar.

3. The device according to claim 1, wherein the rigid component comprises first and second opposite end sides, the first side forming the measurement surface and the second side forming a side in contact with a deformable surface functionally attached to the proof body.

4. The device according to claim 3, wherein the area of the first end side of the component is equal to the area of the deformable surface.

5. The device according claim 1, wherein the flexible mass is overmoulded on the rigid component and on the support.

6. The device according to claim 1, wherein the rigid component is made from a non-deformable material.

7. The device according to claim 6, wherein the rigid component made from a non-deformable material consists mainly of polyetheretherketone (PEEK).

8. The device according to claim 1, wherein the flexible mass is made from a material consisting mainly of silicone or a butyl-based rubber.

9. The device according to claim 1, wherein the proof body is of piezoelectric or strain gauge type.

10. The device according to claim 1, wherein the support comprises an outer surface designed to fit into a hole of a mould opening into the cavity which will contain a material whose pressure is to be measured.

11. A unit comprising a pressure measurement device according to claim 1, and a mould for vulcanizing a rubber for tires comprising:
    an inner wall forming a cavity for the rubber, and
    a hole opening out into the cavity and being adapted to house the device.

* * * * *